W. C. STEWART.
MACHINE FOR SLASHING SOLES OF BOOTS AND SHOES.
APPLICATION FILED NOV. 16, 1908.

958,029.

Patented May 17, 1910.

4 SHEETS—SHEET 1.

W. C. STEWART.
MACHINE FOR SLASHING SOLES OF BOOTS AND SHOES.
APPLICATION FILED NOV. 16, 1908.
958,029.
Patented May 17, 1910.
4 SHEETS—SHEET 2.
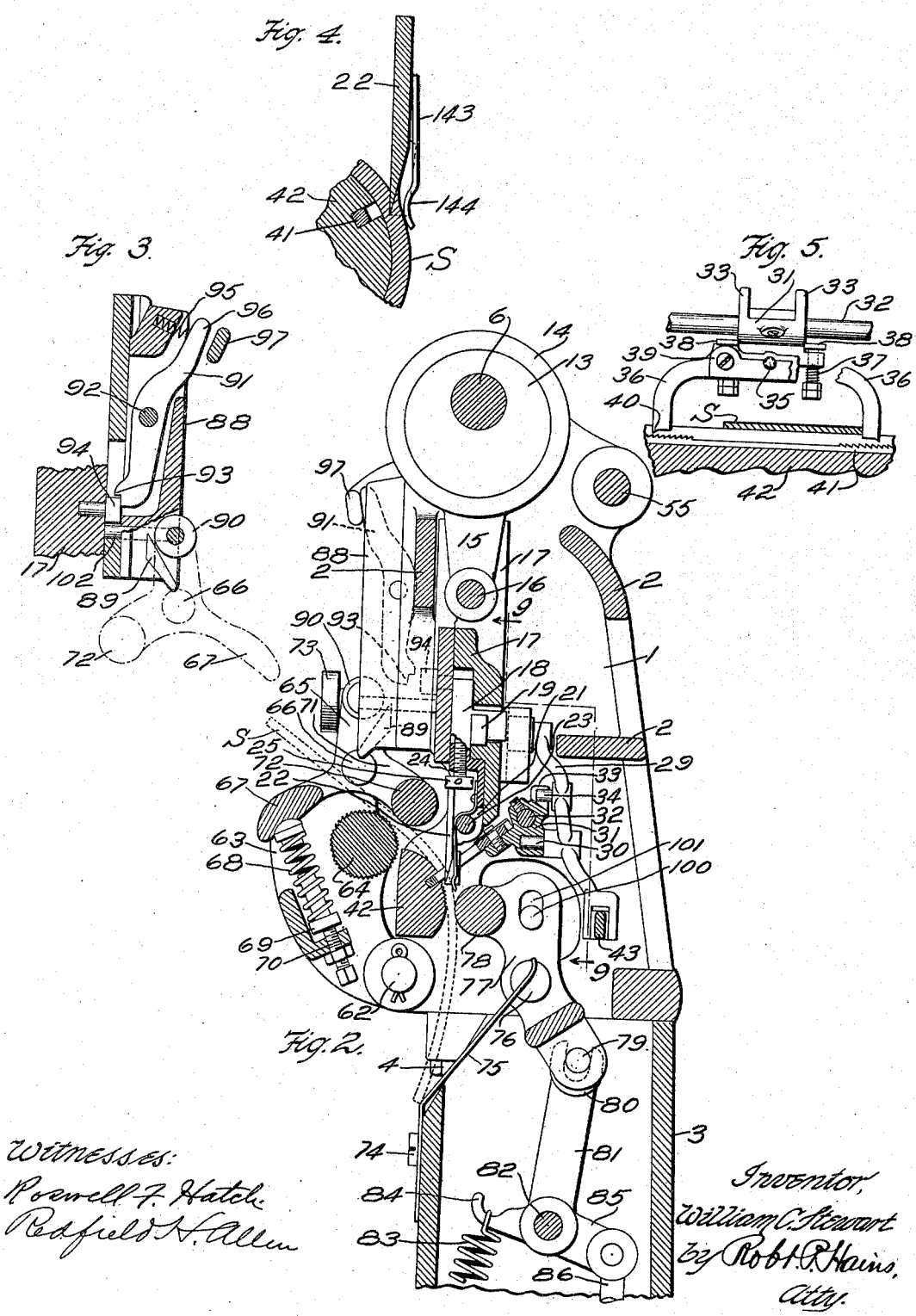
Witnesses:
Powell F. Hatch.
Redfield H. Allen
Inventor,
William C. Stewart
by Robt. R. Hains,
Atty.

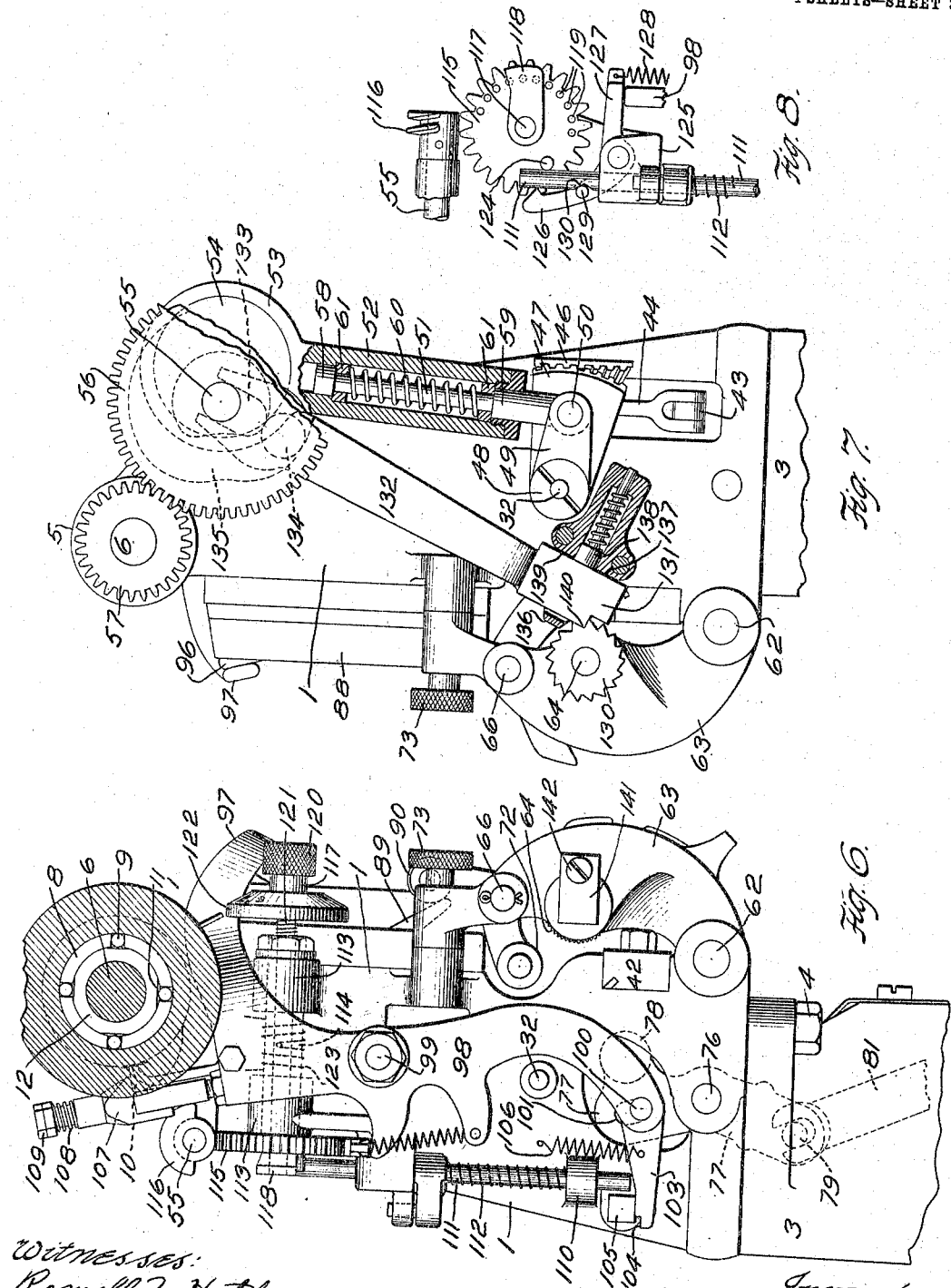

W. C. STEWART.
MACHINE FOR SLASHING SOLES OF BOOTS AND SHOES.
APPLICATION FILED NOV. 16, 1908.

958,029.

Patented May 17, 1910.
4 SHEETS—SHEET 4.

Witnesses:
Powell F. Hatch.
Redfield H. Allen

Inventor,
William C. Stewart,
By Robt. P. Harris.
Atty.

UNITED STATES PATENT OFFICE.

WILLIAM C. STEWART, OF LYNN, MASSACHUSETTS, ASSIGNOR TO THOMAS G. PLANT, OF BOSTON, MASSACHUSETTS.

MACHINE FOR SLASHING SOLES OF BOOTS AND SHOES.

958,029.  Specification of Letters Patent.  Patented May 17, 1910.

Application filed November 16, 1908. Serial No. 462,786.

*To all whom it may concern:*

Be it known that I, WILLIAM C. STEWART, a subject of the King of Great Britain, residing at Lynn, in the county of Essex and State of Massachusetts, have invented an Improvement in Machines for Slashing Soles of Boots and Shoes, of which the following description, in connection with the accompanying drawings, is a specification, like characters on the drawings representing liks parts.

This invention relates to machines for slashing insoles used in the manufacture of boots and shoes, and while the invention may be employed for slashing any kind of insoles, it has peculiar advantages in slashing insoles for use in the manufacture of welted boots and shoes.

The aims and characteristic features of the present invention will be clearly understood from the following description and accompanying drawings of one form or embodiment of means for carrying the invention into effect, it being understood that the invention is not circumscribed by the details of such means, but in its true scope is definitely pointed out in the claims.

Figure 1:
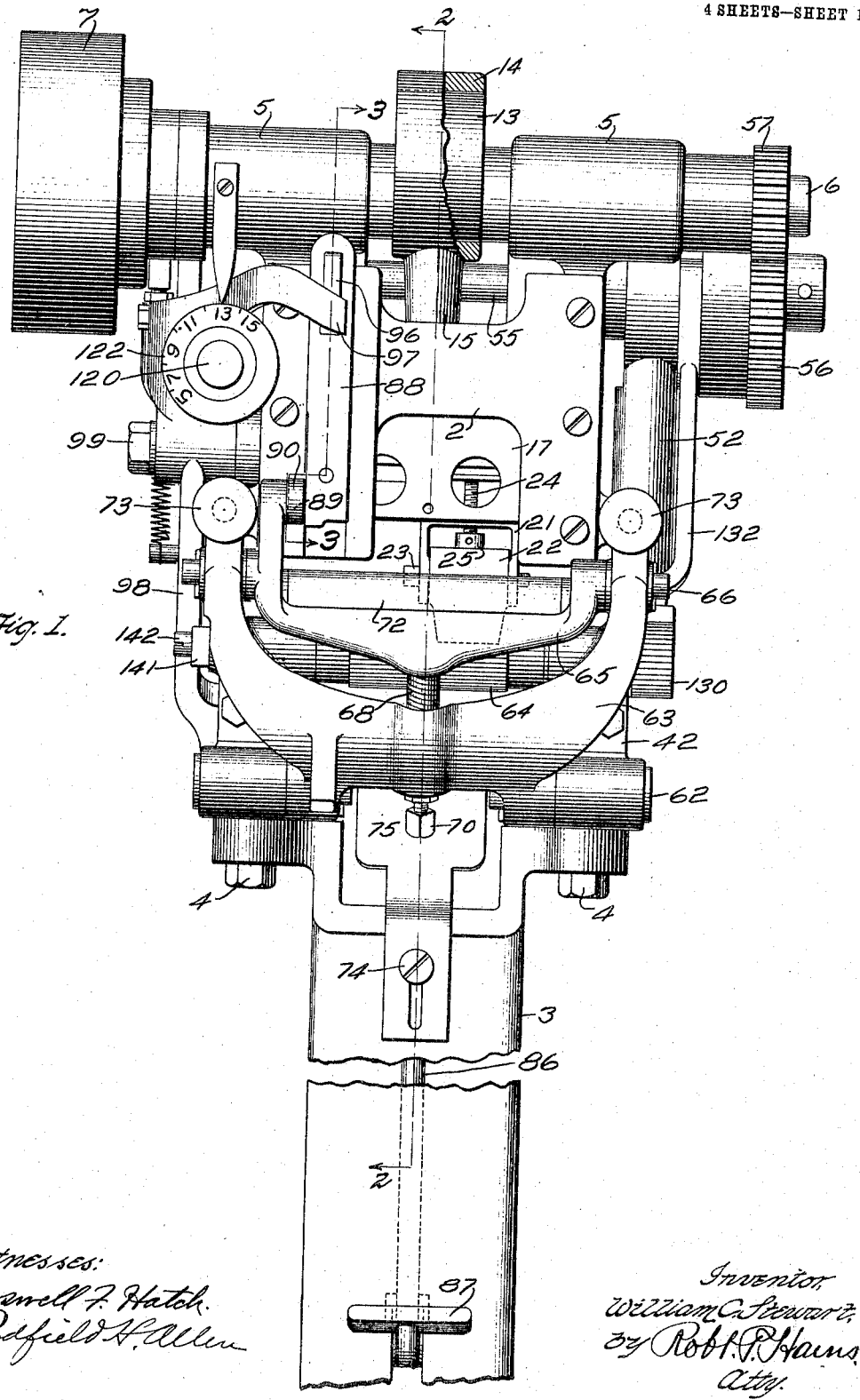
Figure 9:
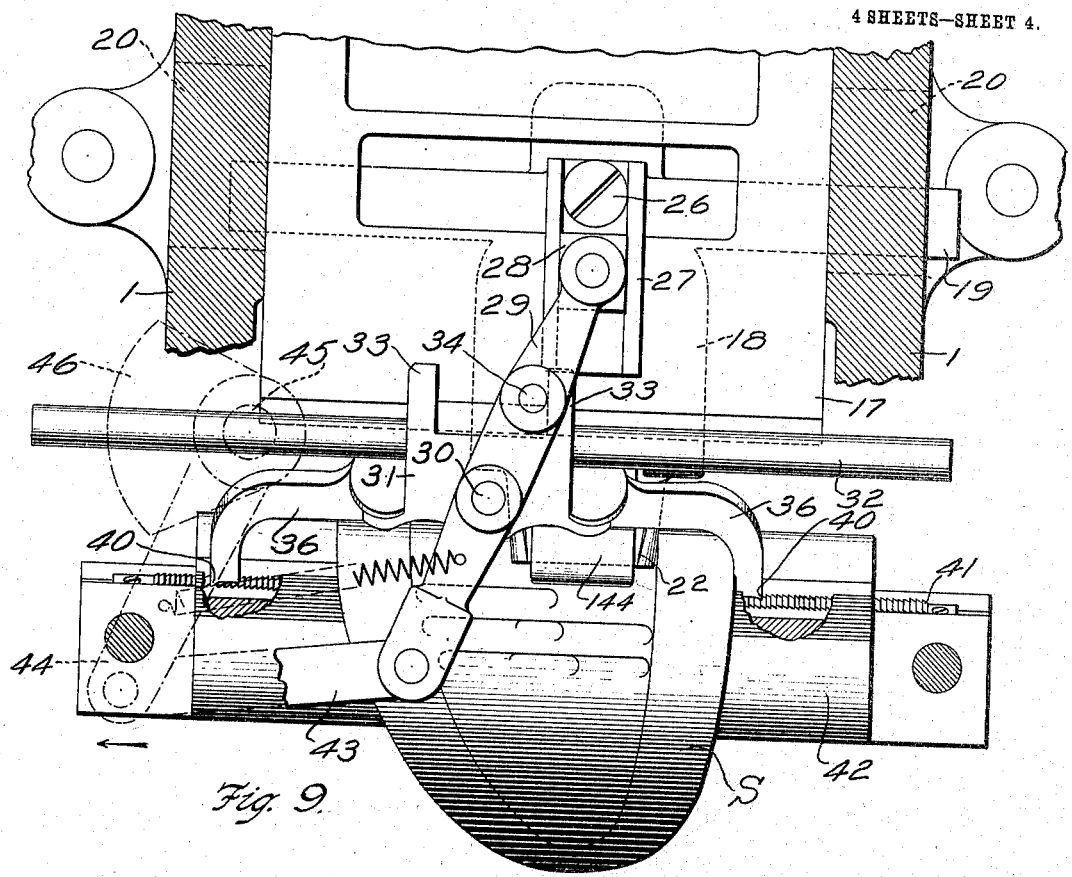
Figure 10:
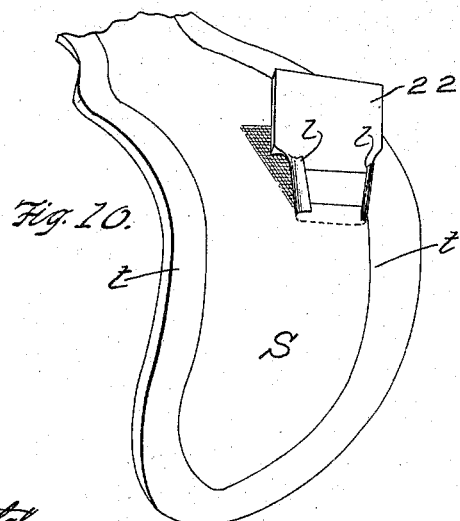

In the drawings, Figure 1 is a front elevation of a machine embracing the present invention, some of the parts being broken away; Fig. 2 is a section on the line 2—2 of Fig. 1; Fig. 3 is a sectional detail on line 3—3 of Fig. 1; Fig. 4 is a sectional detail showing the cutter and its action as it enters and slashes the insole; Fig. 5 is a detached detail view of the work feelers and their locking means; Fig. 6 is a side view of the machine-head looking from the left in Fig. 1, showing the driving shaft and its clutch connection with its driving means in cross section; Fig. 7 is a side view of the machine-head looking from the right in Fig. 1, some of the parts being shown in section or broken away to disclose the construction of parts beyond; Fig. 8 is a detached detail showing parts of the slash counter and stopping means; Fig. 9 is an enlarged sectional view on the line 9—9, Fig. 2, looking from the rear of the machine and showing more particularly the means for moving the slashing cutter and feelers transversely of the sole, and the locking means for the feelers when one of them meets the sole; and Fig. 10 is a diagrammatic view showing a slashing cutter and its relation to the insole channel lip during the cutting action.

In the form of machine illustrated, the head frame for supporting the main portions of the machine is formed of vertical side pieces 1 suitably braced transversely, as by tie pieces 2, Fig. 2, and surmounting a pedestal or base-piece 3 to which it may be connected by suitable means, as the screw bolts 4.

Mounted in suitable bearings 5, 5 of the side pieces 2, 2 is the main driving shaft 6, Figs. 1 and 6, having a driving pulley 7 loose thereon and adapted to be connected at will with and to rotate said shaft through the medium of any suitable or desired clutch mechanism, such, for instance, as shown and described in a prior patent granted to me November 26, 1907, No. 871,967, to which reference may be had. This clutch mechanism is of the well known "roller" type and, since its construction and operation are well understood and fully set forth in said prior patent, it is not necessary to give a detail description and illustration herein, attention being merely directed to the sectional part illustration of said clutch mechanism shown by Fig. 6, wherein the cage 8, for controlling the rollers 9 which are movable along the inclined faces 11 of the hub 12 fast to the shaft 6, is provided with a radially extended ear 10 by which to control the engagement and disengagement of the clutch, all substantially as fully pointed out in said prior patent, the construction being such that when the ear 10 is held by a suitable catch, to be described, it will restrain rotative movement of the cage and disengage the clutch and shaft 6 from driving connection, but when the ear 10 is freed from said catch the cage will be moved by its usual spring, as set forth in said prior patent, and driving connection between the shaft and clutch be established, as will be readily understood by those skilled in the art.

Fast upon the shaft 6 between the bearings 5, 5 is an eccentric 13, Figs. 1 and 2, embraced by an eccentric strap 14, connected by an arm 15 and pin 16 with a reciprocating cross-head 17 adapted for vertical movement in suitable guideways in the head frame 1. Mounted for transverse movement in the cross-head 17 is the knife carrier 18, said carrier being preferably provided with a guiding and supporting bar 19, Figs. 2 and 9, fitted in suitable slide bearings in the cross-head 17, and extending into vertical slots 20 in side pieces 1, the construction being such that as the cross-head 17 is vertically reciprocated by its eccentric connection with the driving shaft 6, the knife carrier 18 may be moved transversely of the cross-head, as will hereinafter more fully appear.

The knife carrier 18 may be provided with any desired form of knife securing means, that shown in the present form of the invention comprising the downwardly extending portions 21, 21 between which the knife 22, Figs. 1 and 2, is securely clamped by a clamp bolt 23 connecting said portions. In order that the knife 22 may be readily adjusted in its carrier, an adjusting screw 24 is threaded into the carrier above the knife and its head 25 bears upon the top of the knife, as in Figs. 1 and 2.

As pointed out in the patent hereinbefore mentioned, the knife blade is of a width not greater than the shortest cut demanded by the width of any insole to be slashed, such shortest cut being usually demanded at or near the toe, though this may not always be the case. At different parts of the sole the width of the sole demands greater length of slashes, to secure which the invention contemplates making a plurality of and preferably two cuts with the knife for each feed movement of the sole, the first cut being made near one edge of the sole and the next nearer the opposite edge of the sole in prolongation of the first cut, the two cuts forming a continuous slash extending transversely of the sole. It is evident, therefore, that for every feed movement of the sole, there must be a plurality of cutting movements of the knife, and that between any two successive cutting movements of the knife, the latter must be moved transversely of the sole. It is also apparent that in treating a sole having a channel lip, the transverse positions of the knife must be such as to slash the sole between the channel lips at each edge thereof but not cut said lips. The characteristics of the invention in these respects will be clear from the following description of one form of means that may be employed to these ends.

Referring to Figs. 2 and 9, the knife carrier 18 has secured thereto by a screw 26, or otherwise, a guideway 27 in which slides a block 28 carried by one end portion of an operating lever 29 pivotally mounted at 30 to a sliding feeler block 31, said block being secured to a supporting slide 32 mounted for endwise movement in the side pieces 1, 1 of the head frame. The sliding feeler block 31 has upwardly projecting ears 33 between which a pin 34, secured to the operating lever 29, travels. From the construction thus far described it will be apparent that if the fulcrum point 30 of the lever 29 be held stationary, the knife carrier and knife will be moved transversely of the cross-head 17. It will also be evident that if the sliding feeler block 31 carrying the fulcrum 30 be permitted to move more or less and then be stopped, the position of the knife 22 will correspondingly vary in its transverse relation with the crosshead or sole.

Pivotally mounted at 35 on the sliding feeler block 31 are the feelers 36, 36 yieldingly maintained in central position on their pivotal connection 35 with the feeler block by means of centering devices of suitable character, those indicated, in Fig. 5, being composed of spring controlled pins 37, the head 38 of which are adapted to bear upon shoulders 39 carried by the feelers 36 at each side of the pivotal connection 35 with the feeler block. The lower end portion of each of the feeler arms 36 is provided with a tooth 40 adapted to engage the teeth of a rack bar 41 secured to the work rest 42, Figs. 2 and 5, whereby when either of said feelers 36 is depressed into engagement with the teeth of the rack bar, further sliding movement of the feeler-block 31 will be stopped and any further actuation of the lever 29 will be transmitted to the knife carrier.

The end of the operating lever 29 opposite the slide block 28 is connected by a link 43 to an arm 44 pivoted at 45, Fig. 9, to the head frame, said arm 44 having connected therewith and movable about its axis 45 a segment gear 46, Figs. 7 and 9. Operatively connected with the segment gear 46 is a similar segment gear 47, mounted at 48 on the head frame, Fig. 7, said segment gear 47 being operatively connected with an arm 49 jointed at 50 to a rod 51 contained within an actuating arm 52. At its upper end the actuating arm 52 is provided with an eccentric strap 53 which surrounds an eccentric 54 secured to a counter shaft 55, which by means of pinions 56 and 57 is in operative relation with the main driving shaft 6, as clearly illustrated in Figs. 1 and 7, the construction being such that upon rotation of the driving shaft 6, motion will be imparted to the counter-shaft 55 and through the eccentric 54 the actuating arm 52 will be given a vertical reciprocating motion, said motion being imparted through the described devices to the operating lever 29.

The rod 51 is provided with an enlarged guiding head 58 near its end and a similar enlargment 59 near its opposite end, between which enlargements is disposed a spiral spring 60, the ends of which bear upon suitable loose collars 61, 61 resting on seats carried by the arm 52, as indicated by Fig. 7, the construction being such that upon vertical reciprocation of the actuating arm 52, the motion imparted to the operating lever 29 will be a yielding one, so that should the parts connected to the operating lever 29 restrain movement of said lever upon its fulcrum 30 at any time, the spring 60 will yield either in the upward or downward reciprocating movement of the arm 52.

From the foregoing construction, it will be clear to one skilled in the art that if a sole to be slashed be placed in position upon the work rest 42, as indicated in Figs. 2 and 9, and the main shaft be given rotative movement, it will, through the described connections, tend to move the operating lever 29 and slide the feeler-block 31 in one direction, or the knife carrier in the opposite direction, or both of these movements may take place until one of the feelers 36 contacts with the edge of the sole, whereupon the opposite feeler arm, see Fig. 9, will be thrown with its tooth 40 into engagement with the rack 41, and the feeler block will then be locked from further transverse movement, such locking of the feeler-block being of a positive nature, as will be understood, without imparting to the edge of the sole being treated any undue strain. The feeler-block being thus stopped from further movement, the knife carrier will continue its movement until the pin 34 carried by the operating lever 29 engages one or the other projecting ears 33, whereupon further transverse movement of the knife carrier will cease, and, if at this time the actuating arm 52 has not completed its stroke, the spring 60 therein will yield, thereby permitting the feeler-block and knife carrier to remain in the position determined for them by the feeler 36 contacting with the edge of the sole. The cross-head 17 will then descend and the knife 22 will be caused to cut a slash into the surface of the sole, whereupon the cross-head will ascend and transverse movements in the opposite direction be imparted to the feeler-block and knife carrier, to position the knife for the next or succeeding cut.

In order that the slashes or cuts produced shall properly extend diagonally into the sole from one surface thereof and that they may be made under the most favorable conditions of the work, the latter is preferably deflected or bent lengthwise at the slashing or cutting point, as indicated in Fig. 2, and is fed progressively forward, as will now be explained.

As before stated, the work rest 42 extends transversely of the machine and is preferably provided with a roughened surface upon which the sole to be treated may rest. Pivotally connected to the head frame at 62 is the swinging feed roller frame 63 carrying a feed roller 64 provided with a suitable roughened surface and a work clamping frame 65 pivoted to the feed roller frame 63 at 66 and having an arm 67 against which one end of a spring 68 bears, the other end of said spring being supported by a seat 69 adjustably held in place by a set screw 70, whereby upon manipulation of the screw 70, the tension of the spring 68 may be varied. Carried on the arm 71 of the work-clamping frame 65 is the work-clamping roller 72 which, when forced toward the feed roller 64 by the spring 68, insures the proper feed movement of the sole S in accordance with the dictates of the feed roller movements, as will be hereinafter more fully described.

In order to hold the feed roller frame 63 in the position indicated, Figs. 1 and 2, the upwardly extending arms thereof are provided with thumb-screws 73 which engage suitable screw thread sockets in the head frame, as will be clearly understood, see Figs. 1, 2, 6 and 7.

It will be clear from the construction of the feed roller frame that it may be readily turned from its operative position indicated in the drawings so that the knife and other portions of the mechanism may be conveniently reached.

Secured to the pedestal 3 by a screw 74 is a stationary stop and guide 75 against which the toe end of the sole S contacts when it is placed in the machine for treatment, Fig. 2.

Mounted on suitable pins 76 projecting from the side pieces of the head frame is a work deflecting or bending frame 77 carrying a work engaging roller 78 and having at its opposite end a pin 79 embraced by the bifurcated end 80 of one arm of the bell crank lever 81 pivoted to the pedestal 3 at 82 and normally maintained in position to hold the work engaging roller 78 away from the work by a spring 83, Fig. 2, said spring being connected at one end to the pedestal and at its opposite end to a finger 84 projecting from the bell crank 81. The arm 85 of the bell crank 81 is connected by a rod 86 to a suitable treadle 87, Figs. 1 and 2, whereby upon depression of the treadle the bell crank 81 will turn the work deflecting or bending frame 77 and cause its work engaging roller 78 to engage the shoe sole and bend the same about the work support 42, as indicated in Fig. 2.

From the construction described with respect to the work clamping frame, it will be apparent that the tendency of the spring 68 is to normally maintain the work clamping roller 72 in its position nearest the feed roll 64, but if in this position when it is desired to insert a shoe sole, difficulty would arise, and the present invention therefore aims to provide means so that when the machine is stopped, the work clamping roller 72 will be lifted so that the work may be easily put in place. The means for accomplishing this result in the present form of the invention comprises a slide 88, Figs. 1, 2 and 3, mounted for vertical movement upon the head frame 1. The slide 88 carries at its lower portion a cam or inclined abutment 89, adapted on upward movement of the slide 88 to contact with a roller 90 carried by the work clamping frame 65, the construction being such that the roller 90 and, consequently, the work clamping frame will be turned by the cam 89 to carry the clamping roller 72 away from the feed roller 64. It is desirable, however, that the slide 88 be not thus raised during the operation of the machine and to this end there is mounted within the slide 88, see Fig. 3, a catch 91 pivoted at 92 to the slide and having its end 93 adapted to engage a projection or stud 94 secured to the cross-head 17, the opposite end 96 of the catch 91 being acted upon by a spring 95 to normally maintain the parts in position, as indicated in Fig. 3, so that should the cross-head 17 be raised with the parts in the position indicated, it will be evident that the catch 91 by its engagement with the stud 94 will lift the slide 88 and cause the cam 89 to swing the work clamping frame upon its pivotal support 66. During the normal operation of the machine, however, the end 96 of the catch 91 is engaged by an arm 97, Figs. 1, 2 and 3, of a controlling lever 98, Fig. 6, pivoted to the head frame at 99 and having a pin 100 projecting from its lower end to engage a slot 101 in the work deflecting or bending frame 77, Figs. 2 and 6. From this construction it will be apparent that when the treadle 81 is depressed and the machine is started, as will be hereinafter described, the controlling lever 98, Fig. 6, will be swung upon its pivot or fulcrum 99, so that its arm 97 will press upon the end 96 of the catch 91 and remove the end 93 of said catch from engagement with the stud or projection 94, and this position of the parts will be maintained during the operation of the machine, as will later appear, so that reciprocation of the cross-head 17 does not effect upward movement of the slide 88 during normal operative conditions, the parts at such time being as indicated by dotted lines in Fig. 2. To insure downward movement of the slide 88, it is provided with a pin 102 which projects beneath the stud 94 on the cross-head.

The controlling lever 98, Fig. 6, carries at its lower end a catch 103, the notched end 104 of which is adapted to engage a stop 105 projecting from the head frame, a spring 106 normally tending to lift the catch 103 into such engagement. From this it will be apparent that upon depression of the treadle and the movement of the controlling lever, as described, the catch 103 will engage the stud 105 and maintain the controlling lever in the position to which it has been moved. At its upper portion the controlling lever carries a toe 107, which may be substantially as set forth in my prior patent, said toe 107 being held in place by a spring 108 interposed between it and the end of its supporting rod 109. The toe 107 is adapted to engage and disengage the ear 10 projecting from the cage 8 of the "roller" clutch and when engaged therewith it frees the driving shaft 6 from driving connection with the source of power, but when disengaged therefrom, it permits the clutch to connect the shaft with the driving power and operate the machine. Obviously, when the controlling lever 98 is moved by the treadle 87 in the manner hereinbefore described, and the catch 103 engages the projection 105, the part 107 will be thrown outward free from the ear 10, and when the catch 103 is tripped from its projection 105, the spring 83, Fig. 2, acting on the bell crank 81, will throw the controlling lever 98 on its pivot 99 and cause the toe 107 to engage the ear 10 and stop the machine.

Shoe soles differ in size, style and quality of material, and it is desirable that the number of slashes made in a shoe sole may be varied and that notwithstanding such variation the machine may be automatically brought to rest when the desired number of slashes are made. To this end, means are herein provided to determine the number of slashes made in a shoe sole and to stop the machine when the desired number has been made.

Mounted to move vertically in suitable bearings 110 in the head frame is a stop rod 111, Figs. 6 and 8, the lower end of which is adapted to meet and disengage the catch 103 from its stop 105, said stop rod being normally held in raised position by a light spring 112, the upper end of which bears upon a projection on the stop rod and the lower end of which rests upon the lower bearing 110.

Mounted in suitable bearings 113, Fig. 6, is a shaft 114 carrying a worm wheel 115 at one end, adapted to be engaged by a broken worm 116, Figs. 6 and 8, on the counter-shaft 55. Extending axially of the shaft 114 is a stem 117 carrying at its end adjacent the worm wheel 115 a finger 118, said finger having a pin adapted to engage one of a series of holes 119 in the face of the said worm wheel, whereby the toe 118 is made to rotate with and partake of the movements of the worm wheel 115. The outer end of the stem 117 is provided with a hand piece 120 whereby it may be moved to the left, Fig. 6, against the tension of a spring 121 surrounding said stem and interposed between a fixed part of the head frame and a disk 122 having an index thereon. From this construction it will be apparent that the toe 118 may be adjusted to cause more or less rotation of the worm wheel 115 prior to the time that the toe 118 will strike the end of the stop rod 111, Fig. 8, thereby determining the number of cycles of operation in the machine prior to its being stopped, as will be clearly understood by those skilled in the art.

A spring 123 surrounding the shaft 114, Fig. 6, tends normally to return the worm wheel 115 to its initial position with the pin 124, Fig. 8 bearing against the stop rod 111. Pivoted to a depending bracket 125 secured to the machine head is a pawl 126, its end 127 being normally depressed by a spring 128 to throw the toothed end 126 of the pawl into engagement with the worm wheel 115, said pawl thereby acting to restrain return movement of the worm wheel 115 to initial position when the broken portion of the worm 116 meets the teeth of the worm wheel. Secured to the pawl 126 is a pin 129 which when the machine is in operative condition is disposed opposite a recess 130, Fig. 8, in the stop rod 111.

From the construction described, it will be apparent that proper adjustment of the toe 118 with respect to the worm wheel 115 may be made to secure any desired number of machine operations and consequent slashes given to a sole, and that after the desired number of slashes has been made, the toe 118 will contact with the upper end of the stop rod 111, depress the same, and cause its lower end to trip the catch 103 from the stop 105, thereby permitting the controlling lever 98 to swing under the influence of the spring 83, Fig. 2, and carry its toe 107 into position for engagement with the ear 10 as it completes its rotation, and relieve its arm 97 from contact with the end 96 of the catch 91, the upward movement of the crosshead 117 at such times thereby lifting the slide 88 and turning the work clamping frame 65 to carry the clamping roller 72 from its bearing upon the work. When the broken worm 116 reaches a position to free the teeth of the worm wheel 115, the spring 123 will return the worm wheel 115 to its original position with the pin 124 bearing against the stop rod, Fig. 8.

The feeding roll actuating mechanism is such that when the roll has been moved one step to advance the sole, it is locked against further movement in either direction to insure a proper hold of the sole during slashing, and is likewise characterized by an advance or feeding step after completion of each transverse slash, such completion in the present form of the invention demanding two reciprocations of the cutter or knife. This mechanism is best shown by Fig. 7, wherein the end of the feed roll 64 is shown provided with a ratchet wheel 130, the teeth of which are adapted to be engaged by the stepped end 131 of an actuator 132, the upper end of which is bifurcated at 133 to embrace and be guided by the counter-shaft 55. The actuator 132 is provided with a roll 134 engaging a cam groove 135 preferably formed on the face of the gear 56 secured to the counter shaft 55, although it might be otherwise actuated.

The end 131 of the actuator passes through a guide formed by the walls 136 and 137, a spring pressed plunger 138 normally acting to press the end 131 into engagement with the teeth of the ratchet, and, as the actuator moves downward and turns the feed roll, to yield sufficiently to allow the side wall 139 to rest against the wall 137, thereby locking the roll from further forward or backward movement, the corner 140 at such time resting between two teeth of the ratchet 130.

To prevent backward rotation of the feed roll 64 as the actuator moves up for a new tooth, a friction piece 141, Fig. 6, is caused to bear against the end of the feed roll by a screw 142.

To insure proper action of the knife upon the material of the sole, it is desirable that the sole be bent or deflected longitudinally at the slashing line and that the knife shall enter obliquely into the sole and not entirely penetrate it. To meet these objects the present invention contemplates means coöperating with the knife to insure the longitudinal bend of the sole along the slashing line and also to prevent complete penetration of the knife toward the opposite surface of the sole. Figs. 2 and 4 of the drawing show one means illustrative of this feature of the invention comprising a plate 143, secured, as indicated in Fig. 2, to the knife carrier and movable thereby. This feature of the invention may be variously carried into effect, and for identification the means employed may be designated a slash director, because by inclining the work surface where the knife enters, the oblique direction of the slashes is insured. The plate 143 may extend more or less across the face of the knife 22 and at its lower portion may preferably be formed or curved, as at 144, so that on meeting the sole S it will turn or tend to turn the latter along the line to be slashed and exercise an influence upon the knife to prevent too deep penetration toward the surface resting on the work support 42. While it is not essential that the slash regulator shall be formed separate from the knife itself or project below the knife edge, it has been found desirable to cause it to act upon the sole slightly in advance of the knife and be actuated in this movement by the reciprocations of the cross head.

In a prior patent granted to me and dated November 26, 1907, No. 871,969, a sole slashing machine was shown, described and claimed for producing slashes in an insole at an angle to each other, and a knife having a straight cutting edge and side cutting edges was shown as one means of carrying the invention into effect. The present invention contemplates this same characteristic operation upon the sole to be slashed by a knife generically of the same character but specifically differing therefrom, as shown by Fig. 10. In said Fig. 10, the sole S is shown in substantially the position it occupies as the knife 22 does its work. This sole is provided with a channel lip $t$, which should not be cut by the knife, and yet the knife should cut the entire area between the channel lips. As the knife sinks into the sole toward the toe, its narrowest part, the side edges of the knife might in some instances slightly cut the inner edge of the lip. In the present form of knife, however, the side edges $l$, $l$, Fig. 10, are inturned, so that while the lower cutting edge sinks into the sole and the advance cutting portions of the side edges $l$, $l$ make substantially longitudinal cuts, they do not act upon the edge of the channel lip, but allow the knife to get well under the lip without injury thereto. While this form of knife is desirable for some purposes, it will be understood that other features of the invention may be employed quite regardless of the style of knife or its slash regulator, and that various changes may be made in the mechanism employed within the scope of the present invention.

What is claimed is:

1. In a shoe sole slashing machine, the combination of a work rest having a curved or rounded surface to support the shoe sole, reciprocating slashing means, actuating means therefor to produce progressively a slashed area comprising slashes of varying lengths, and a slash director movable with the slashing means to bend the sole about the rounded surface of the work rest that the slashing means may act on the shoe sole in a direction oblique to the surface thereof.

2. In a sole slashing machine, the combination of a work rest to support the shoe sole to be slashed, a cutter, means to reciprocate the cutter to cause the cutter to slash the sole, and a slash director movable with the cutter to bend the sole about the work rest that the cutter may act on the shoe sole in a direction oblique to the surface thereof.

3. In a sole slashing machine, the combination of a work rest, a cutter carrier, a cutter carried thereby, means to move the cutter carrier to cause the cutter to slash the sole, and a slash director coöperating with the cutter and moving in advance thereof to bend the shoe sole over the work rest that the slash made by the cutter may be oblique to the surface of the shoe sole.

4. In a sole slashing machine, the combination of a work rest, slashing means, means for reciprocating the slashing means to slash the sole, and a slash director to contact with the sole in advance of the slashing means to bend the sole about the work rest where the cutter is to act and cause the slashes to be directed obliquely into the shoe sole.

5. In a sole slashing machine, the combination of a cutter carrier, a cutter carried thereby, means to move the cutter carrier to cause the cutter to slash the sole, and means movable with the cutter to present the surface of the sole obliquely to the action of the cutter that the cutter may act upon the inclined surface of and penetrate the sole in a direction oblique to the surface thereof.

6. In a sole slashing machine, the combination of a cutter carrier, a cutter carried thereby, means to reciprocate the cutter to cause it to slash a sole, and means movable by the cutter operating means to contact with the sole in advance of the cutter to bend the surface of the sole at the point to be cut in a direction oblique to the action of the cutter that the cutter may enter the sole in a direction oblique to the surface thereof.

7. In a sole slashing machine, a support for a shoe sole, slashing means to act upon and slash the sole on said support, and means movable by the slashing means to curve the surface of the sole about the support that the slashing means may act on the curved surface of and penetrate the sole in a direction oblique to the surface thereof.

8. In a sole slashing machine, the combination of a support for a shoe sole, a crosshead, means to relatively move the crosshead and support toward and from each other, a knife carried by the cross-head, and a plate at one side of the knife and movable therewith to contact with the sole and curve or bend the same at the point to be cut that the knife may act in a direction oblique to the surface of the sole.

9. In a sole slashing machine, the combination of a support for a shoe sole, a knife, means to move the knife to cause it to slash the sole, and a plate disposed at one side of the knife and projecting beyond the cutting edge thereof to contact with the sole and bend the same about the support at the point to be slashed that the knife may enter the sole oblique to the surface thereof.

10. In a sole slashing machine, the combination of a support for a shoe sole about which the sole may be bent, a knife, means to move the knife to cause it to slash the sole, and a plate disposed at one side of the knife and projecting beyond the cutting edge thereof to contact with the sole and bend the same about the support to present the sole surface at an angle oblique to the plane of knife movement, said plate having a curved lower portion.

11. In a sole slashing machine, the combination of a work support, slashing means for slashing a shoe sole on said support, and means governed by the work for positioning and locking the slashing means for its slashing movement.

12. In a sole slashing machine, the combination of a work support, slashing means for slashing a shoe sole on said support, means for moving the slashing means transversely of the shoe sole on said support, and means governed by the work for determining the transverse position of the slashing means and positively locking the same in position for making a slash.

13. A sole slashing machine of the character described, comprising a support for a shoe sole, a cutter for cutting slashes in a sole on said support, means for reciprocating the cutter, means for relatively moving the cutter and sole transversely, and work governed means for determining the extent of such relative transverse movement and positively locking it in position for making a cut.

14. A sole slashing machine comprising, in combination, a cutter, a work support, actuating means for causing the cutter to form separate slashes in the sole, means for relatively moving the cutter and sole transversely to locate a slash, and work governed means for determining the extent of said relative movement and positively locking the cutter and sole in the determined transverse relation.

15. In a sole slashing machine, the combination of a work support for sustaining a shoe sole, a cutter, means for reciprocating the cutter toward and from the sole on the work support, means for moving the cutter transversely of the sole into position for making a cut, and means governed by a dimension of the work for positively locking the cutter in its position for making a cut.

16. In a sole slashing machine, the combination of a support for sustaining a shoe sole to be slashed, a cutter movable into a plurality of transverse positions with relation to said sole, means for reciprocating the cutter in any of its transverse positions, and work governed means for determining the transverse position of the cutter and for positively locking it in such transverse position.

17. In a sole slashing machine, the combination of a work support for sustaining a shoe sole to be slashed, a cutter, a cross-head for reciprocating the cutter toward and from the sole on said support, yielding means for moving the cutter transversely of said cross-head, means to vary the transverse movements of the cutter in accordance with the sole being treated, and means for positively locking the cutter in a determined transverse position.

18. In a sole slashing machine, the combination of a work support, a cutter, means for reciprocating the cutter toward and from the sole on the work support, a feeler slide block, said cutter and feeler slide block being movable transversely of the machine, an actuating lever connected to the cutter and feeler slide block, means for actuating the lever, and feelers mounted on the feeler slide block for positioning the cutter with reference to the work.

19. In a sole slashing machine, a work support for sustaining a shoe sole to be slashed, a cutter for cutting slashes into said sole, means for moving the cutter transversely of the sole, feelers to engage the work and determine the transverse movement of the cutter, and a lock operative upon engagement of a feeler with the work to hold the feelers from further movement.

20. In a sole slashing machine, the combination of a work support for sustaining a shoe sole to be slashed, a cutter having a cutting edge to form transverse cuts in said sole and provided with inturned side cutting portions to extend under the channel lip of a sole, and means for reciprocating said cutter in a direction oblique to the sole surface.

21. In a sole slashing machine, the combination of a work support for sustaining a shoe sole to be slashed, a cutter having a cutting edge to form transverse cuts in said sole and provided with inturned side cutting portions to extend under the channel lip of a shoe sole, means for reciprocating said cutter, and means for changing the path of reciprocation of the cutter transversely of the work.

22. In a sole slashing machine, the combination of a main frame, a work support for sustaining a shoe sole to be slashed, slashing means, a feed roller supporting frame carrying a feed roller, said feed roller supporting frame being jointed to the main frame to swing the feed roller into and out of operative position, and means for holding the frame in operative position.

23. In a sole slashing machine, the combination of a work support for sustaining a shoe sole to be slashed, slashing means for slashing a sole on said support, a feed roller having a series of ratchet teeth, an actuator for moving the feed roller step-by-step, and yielding guiding means for the end of the actuator to permit the latter to yield as it turns the feeding roll, the end of said actuator being formed with a portion to engage the opposite walls of adjacent teeth to move the feed roller and lock it from reverse rotation.

24. In a sole slashing machine, the combination of a supporting frame, slashing means sustained thereby, work sustaining means over which the work passes, work clamping roller for pressing the work upon the said sustaining means during the operation of the machine, and automatic means acting to relieve the work of the pressure of the work clamping means when the machine stops.

25. In a sole slashing machine, the combination of a supporting frame, slashing means for the work, a feed roller and opposed pressing roller disposed in front of the slashing means, means normally acting to press one of said rollers toward the other, and a frame jointed to the main frame and carrying said rollers.

26. In a sole slashing machine, the combination of a main frame, a cutter and its operating means, a feed roller frame jointed to the main frame and disposed in front of the cutter, a feed roller carried by said frame, a work clamping frame carrying a work clamp and jointed to the feed roller frame, and means normally acting to maintain the feed roller and clamp in work clamping relation.

27. In a sole slashing machine, the combination of a frame, a cutter and its actuating means for producing slashes in a shoe sole, a work support for supporting the sole as it is being slashed, a work feeding roller, a clamping roller opposed to the feeding roller, automatically acting means for normally clamping the sole between the feed roller and clamping roller, and means acting automatically as the machine stops to separate the feeding and clamping rollers.

28. In a sole slashing machine, the combination of a frame, a cutter and its actuating means for producing a series of cuts or slashes in a shoe sole, clamping means for holding the work during the action of the cutter, a slide having a clamp releasing member, and means for actuating the slide to free the work from the clamping means as the machine stops.

29. In a sole slashing machine, the combination of a frame, a cutter and its actuating means for producing a series of cuts or slashes in a shoe sole, clamping means for holding the work during the action of the cutter, a slide having a clamp releasing member, a catch carried by the slide, and a controller for holding the catch in inoperative position during the action of the cutter and to permit the catch to move to operative position and move the slide as the machine is stopped.

30. In a sole slashing machine, the combination of a frame, a cutter and its operating means for producing a series of cuts or slashes in a shoe sole, a controlling lever for determining the operative or inoperative condition of the machine, means for locking the controlling lever in position for machine operation, a stop rod, and means to move the stop rod and free the controlling lever to cause the machine to stop after a predetermined number of cuts or slashes have been made.

31. In a sole slashing machine, the combination of a frame, a cutter and its operating means for producing a series of cuts or slashes in a shoe sole, a controlling lever for determining the operative or inoperative condition of the machine, means for locking the controlling lever in position for machine operation, a stop rod, and adjustable slash counter mechanism to determine the number of slashes or cuts to be made in a shoe sole operative to move the stop rod and free the controlling lever when the desired number of slashes or cuts have been made.

32. In a sole slashing machine, the combination of a frame, a work support for sustaining a shoe sole, a cutter and its actuating means for producing slashes or cuts in a shoe sole on said support, a fixed stop to meet the end of and position the shoe sole longitudinally for the action of the cutter, and means to feed the sole through the machine.

33. In a sole slashing machine, the combination of a frame, a work support for sustaining a shoe sole, a cutter and its actuating means for producing slashes or cuts in a shoe sole on said support, a fixed stop to meet the end of and position the shoe sole for the action of the cutter and then deflect the sole as it is fed, work deflecting or bending means to act upon the sole beyond the cutting point, and means to feed the sole through the machine.

34. In a sole slashing machine, the combination of a work support for sustaining a sole to be slashed, a cutter, means to reciprocate the cutter in different transverse paths relative to the sole on said support, said cutter having inturned edge cutting portions to extend under the channel lip, and means movable with the cutter to deflect the sole over said support at the cutting point to permit the cutter to enter the sole in a direction oblique to the sole surface.

35. In a sole slashing machine, the combination of a work support, slashing means for slashing a shoe sole on said support, feelers adapted to engage the sole and determine the relative transverse position of the slashing means and sole for making a slash, and means for locking the parts in such relative position during the operation of the slashing means.

36. In a sole slashing machine, the combination of a support for the work, a feed roller and a presser roller between which the work passes, means acting normally to force the presser roller and feed roller toward each other, a bender for bending the sole over the support, a controlling lever, connections between the controlling lever and bender for releasing the sole from the bender when the machine stops, and means governed by the controlling lever for releasing the sole from the feeding and presser rollers.

37. In a sole slashing machine, the combination of a support for the sole, transversely movable sole slashing means for slashing the surface of the sole at different parts of its width, a transversely sliding feeler block, feelers carried by the feeler block to engage the shoe sole, a lever connecting the sliding feeler block and transversely movable slashing means, and means to move the lever to cause the feeler block to slide transversely until a feeler meets the sole and then move the slashing means transversely to position the same for making a slash.

38. In a sole slashing machine, the combination of a support for the sole, transversely movable sole slashing means for slashing a sole at different parts of its width, a transversely sliding feeler block, feelers carried by said block to engage the shoe sole, a lever connecting the feeler block and slashing means, means to move the lever to cause the feeler block and slashing means to move relatively in a transverse direction, and means to lock the parts in assumed transverse relation during the slashing operation.

39. In a sole slashing machine, the combination of a support for the sole, transversely movable sole slashing means for slashing a sole at different parts of its width, a transversely sliding feeler block, feelers carried by said block to engage the shoe sole, a lever connecting the feeler block and slashing means, means acting yieldingly to move the lever to cause the feeler block and slashing means to move relatively in a transverse direction, and means to lock the parts in assumed transverse relation during the slashing operation.

40. In a sole slashing machine, the combination of a support for a shoe sole, slashing means for slashing the surface of a shoe sole on said support, a controlling lever, a feed roller and presser roller between which the sole is fed to the support, a treadle for moving the controlling lever for starting the machine, means acting on said lever to trip the same when a determined number of slashes have been made, and means governed by the controlling lever for separating the feeding and pressing rollers to free the sole after the controlling lever has been tripped.

In testimony whereof, I have signed my name to this specification, in the presence of two subscribing witnesses.

WILLIAM C. STEWART.

Witnesses:
REDFIELD H. ALLEN,
WILLIAM J. BRENNAN.